(12) United States Patent
Nitta et al.

(10) Patent No.: US 11,372,220 B2
(45) Date of Patent: Jun. 28, 2022

(54) CAMERA LENS OF CATADIOPTRIC OPTICAL SYSTEM

(71) Applicant: AAC Optics Solutions Pte. Ltd., Singapore (SG)

(72) Inventors: Koji Nitta, Osaka (JP); Kaoru Yamazaki, Osaka (JP)

(73) Assignee: AAC Optics Solutions Pte. Ltd., Singapore (SG)

( * ) Notice: Subject to any disclaimer, the term of this patent is extended or adjusted under 35 U.S.C. 154(b) by 115 days.

(21) Appl. No.: 16/916,166

(22) Filed: Jun. 30, 2020

(65) Prior Publication Data

US 2021/0396979 A1   Dec. 23, 2021

(30) Foreign Application Priority Data

Jun. 23, 2020   (JP) .............................. JP2020-108122

(51) Int. Cl.
  *G02B 17/08*   (2006.01)
(52) U.S. Cl.
  CPC ................. *G02B 17/0856* (2013.01)
(58) Field of Classification Search
  CPC . G03F 7/70225; G03F 7/70233; G02B 17/08; G02B 17/0804; G02B 17/0808; G02B 17/0856; G02B 17/086; G02B 17/0864; G02B 17/0876; G02B 17/0884; G02B 17/0888
  See application file for complete search history.

(56) References Cited

U.S. PATENT DOCUMENTS

| | | | | | |
|---|---|---|---|---|---|
| 4,128,305 | A | * | 12/1978 | Liu | ..................... G02B 17/0808 359/730 |
| 4,188,091 | A | * | 2/1980 | Fujii | .................. G02B 17/0808 359/731 |
| 4,666,259 | A | * | 5/1987 | Iizuka | ................ G02B 17/0808 359/731 |
| 8,289,630 | B2 | * | 10/2012 | Togino | ................... G02B 13/06 359/726 |
| 10,877,244 | B1 | * | 12/2020 | Chen | .................. G02B 13/0015 |
| 10,996,449 | B2 | * | 5/2021 | Dai | ....................... G02B 17/086 |

(Continued)

FOREIGN PATENT DOCUMENTS

CN       111679397 A   *   9/2020
GB       2144874 A   *   3/1985   ......... G02B 17/0884

*Primary Examiner* — Christopher Stanford
(74) *Attorney, Agent, or Firm* — W&G Law Group

(57) ABSTRACT

Provided is a camera lens of a catadioptric optical system, consisting of two lens assemblies and one lens group and having a small height, a narrow angle, and good optical characteristics. The camera lens includes: a first lens assembly including an object side surface having a first refractive surface and a second reflective surface in a peripheral region and a central region thereof, and an image side surface having a second refractive surface, a fifth refractive surface and a sixth refractive surface that are sequentially arranged from a peripheral region to a central region thereof; a second lens assembly including an object side surface having a third refractive surface and a fourth refractive surface that are sequentially arranged from a peripheral region to a central region thereof, and an image side surface having a first reflective surface; and a third lens group having a refractive power.

4 Claims, 8 Drawing Sheets

(56) References Cited

U.S. PATENT DOCUMENTS

| | | | |
|---|---|---|---|
| 2013/0057971 A1* | 3/2013 | Zhao | G02B 13/06 359/731 |
| 2016/0187631 A1* | 6/2016 | Choi | G02B 3/02 359/708 |
| 2018/0252905 A1* | 9/2018 | Dainty | G02B 17/004 |

* cited by examiner

CAMERA LENS OF CATADIOPTRIC OPTICAL SYSTEM

TECHNICAL FIELD

The present invention relates to the optical lens field, and particularly, to a camera lens related to a narrow-angle lens of a miniature catadioptric optical system.

BACKGROUND

In recent years, various imaging devices using imaging elements such as CCDs and CMOSs have been widely applied. With the development of miniaturization and high performance of these imaging elements, it is urgent to develop a camera lens of a catadioptric optical system with a small height, a narrow angle, and good optical characteristics.

The technologies related to the camera lens of the catadioptric optical system having a small height, a narrow angle, and good optical characteristics are under development. As a camera lens of the catadioptric optical system, a camera lens provided in a related art includes a first lens and a second lens that are arranged from an object side and separated by an air gap. A first refractive surface is formed in a peripheral region of an object side surface of the first lens, and a second reflective surface is formed in a central region of the object side surface of the first lens. A first reflective surface is formed in a peripheral region of an image side surface of the second lens, and a second refractive surface is formed in a central region of the image side surface of the second lens.

In an existing camera lens of the catadioptric optical system in the related art, a ratio of a refractive index of the peripheral region of the first lens to an abbe number of the first lens, a ratio of a refractive index of the peripheral region of the second lens to an abbe number of the second lens, a ratio of the refractive index of the peripheral region of the first lens to a focal length of the central region of the second lens, and a ratio of the refractive index of the peripheral region of the second lens to the focal length of the central region of the second lens are insufficient, a field of view angle is greater than or equal to 21.4°, and the angle is not narrow enough.

SUMMARY

An object of the present invention is to provide a camera lens of a catadioptric optical system having a small height, a narrow angle, and good optical characteristics. The camera lens consists of two lens assemblies and one lens group.

For the above object, a ratio of a refractive index a first lens assembly to an abbe number of the first lens assembly, a ratio of a refractive index of a second lens assembly to an abbe number of the second lens assembly, a ratio of the refractive index of the first lens assembly to a combined focal length of the third lens group, and a ratio of the refractive index of the second lens assembly to the combined focal length of the third lens group have been intensively studied, and it is found that a camera lens of a catadioptric optical system of the present invention can solve the technical problems in the related art.

A camera lens according to a first technical solution includes, sequentially from an object side, a first lens assembly having a reflective power and a refractive power, wherein an object side surface of the first lens assembly includes a first refractive surface in a peripheral region thereof and a second reflective surface in a central region thereof, and an image side surface of the first lens assembly includes a second refractive surface, a fifth refractive surface and a sixth refractive surface that are sequentially arranged from a peripheral region to a central region thereof; a second lens assembly having a reflective power and a refractive power, wherein an object side surface of the second lens assembly includes a third refractive surface and a fourth refractive surface that are sequentially arranged from a peripheral region to a central region thereof, and an image side surface of the second lens assembly includes a first reflective surface; and a third lens group having a refractive power. The camera lens satisfies following conditions:

$$0.035 \leq (nd1/v1)+(nd2/v2) \leq 0.085;\ \text{and}$$

$$-0.40 \leq (nd1+nd2)/f3g \leq -0.10,$$

where nd1 denotes a refractive index of d line of the first lens assembly;

nd2 denotes a refractive index of d line of the second lens assembly;

v1 denotes an abbe number of the first lens assembly;

v2 denotes an abbe number of the second lens assembly; and f3g denotes a combined focal length of the third lens group.

The camera lens according to a second technical solution further satisfies a following condition:

$$-0.20 \leq d9/f3g \leq 0.00,$$

where d9 denotes an on-axis distance from the sixth refractive surface to a seventh refractive surface.

The camera lens according to a third technical solution further satisfies a following condition:

$$0.25 \leq TTL/f \leq 0.35,$$

where

TTL denotes an optical length indicating an on-axis distance from the second reflective surface to an image plane;

f denotes a focal length of the camera lens.

The camera lens according to a fourth technical solution further satisfies a following condition:

$$-0.85 \leq TTL/f3g \leq -0.20,$$

where

TTL denotes an optical length indicating an on-axis distance from the second reflective surface to an image plane.

The camera lens according to a fifth technical solution further satisfies a following condition:

$$3.05 \leq TTL/IH \leq 3.40,$$

where

TTL denotes an optical length indicating an on-axis distance from the second reflective surface to an image plane; and IH denotes a maximum image height.

Technical Effects

According to the present invention, an optical path of a catadioptric optical system, consisting of a first lens assembly, a second lens assembly and a third lens group and being coaxial twice, is configured in such a manner that the diffraction limit of the lens is improved, the advantages such as telephoto is achieved, and a small and compact narrow-angle lens is provided. The present invention provides a camera lens, consisting of two lens assemblies and one lens group, suitable for portable module cameras that adopt high-pixel CCD, CMOS, or other imaging elements, having a small height, guaranteeing a narrow angle, and also having good optical characteristics.

DESCRIPTION OF EMBODIMENTS

Figure 1:
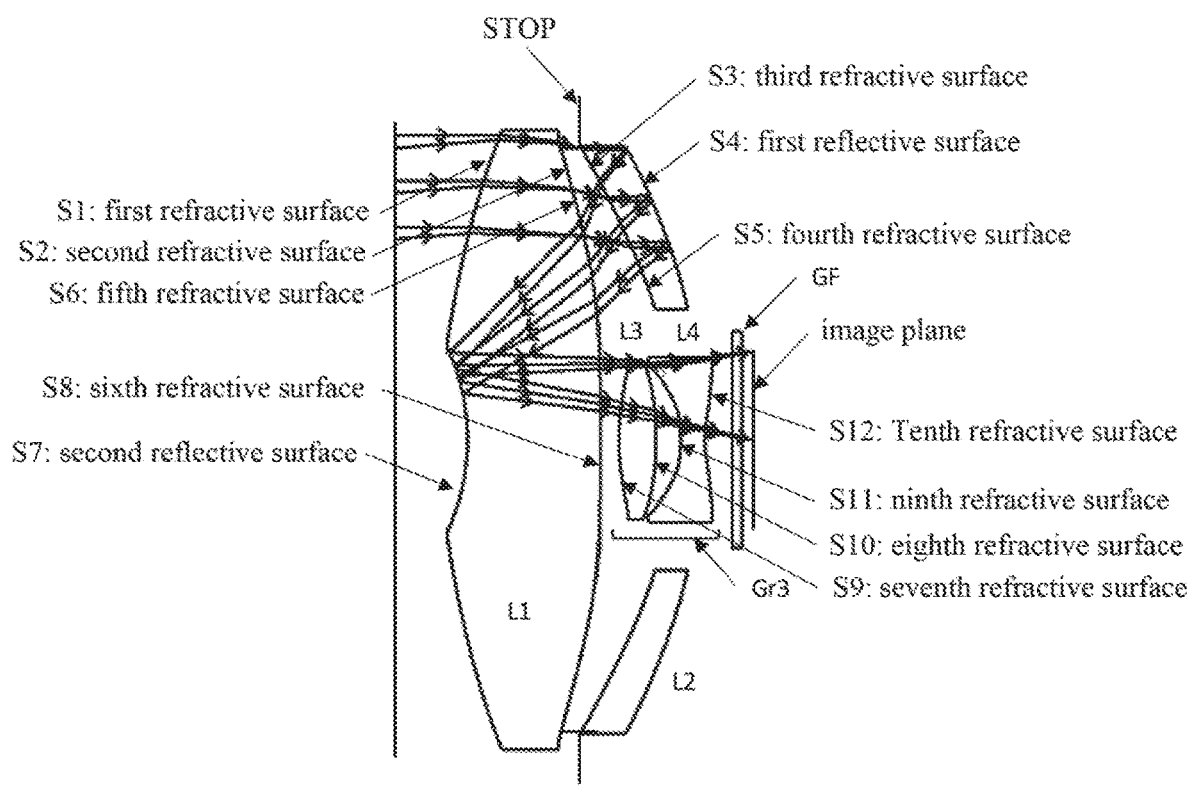
FIG. 1 is a schematic diagram showing an overview of a structure of a camera lens LA according to a first embodiment of the present invention.

The embodiments of the camera lens of the catadioptric optical system according to the present invention will be described below. The camera lens LA of the catadioptric optical system is provided with a lens system. The lens system includes a first lens assembly L1, a second lens assembly L2 and a third lens group Gr3 (i.e., two lens assemblies and one lens group), arranged from an object side to an image side. A glass plate GF is arranged between the third lens group Gr3 and an image plane. A cover glass plate or any of various filters can be used as the glass plate GF. In the present invention, the glass plate GF may be arranged at different positions, or may also be omitted.

The camera lens includes the first lens assembly L1 having a reflective power and a refractive power, the second lens assembly L2 having a reflective power and a refractive power, and the third lens group Gr3 having a refractive power. An object side surface of the first lens assembly L1 includes a first refractive surface S1 in its peripheral region and a second reflective surface S7 in its central region. An image side surface of the first lens assembly L1 includes a second refractive surface S2, a fifth refractive surface S6 and a sixth refractive surface S8 that are sequentially arranged from its peripheral region to its central region. An object side surface of the second lens assembly L2 includes a third refractive surface S3 and a fourth refractive surface S5 that are sequentially arranged from its peripheral region to its central region, and an image side surface of the second lens assembly L2 includes a first reflective surface S4. In order to correct various aberrations, it is desirable to design all surfaces of these two lens assemblies and one lens group as aspherical surfaces.

Herein, the central region refers to a region near a center of a lens surface, which is an optical axis of the lens, and the peripheral region refers to a region of the lens surface excluding the central region, i.e., a region near a periphery of the lens surface.

Light incident to the first refractive surface S1 passes through the second refractive surface S2 and the third refractive surface S3 sequentially, and then is reflected by the first reflective surface S4. After that, the light passes through the fourth refractive surface S5 and the fifth refractive surface S6 and is then incident to the second reflective surface S7, and after being reflected by the second reflective surface S7, the light passes through the sixth refractive surface S8 and is then incident to the third lens group Gr3.

In an example, the first lens assembly L1 is of a unibody structure, and the second lens assembly L2 is of a unibody structure. In another example, at least one of the first lens assembly and the second lens assembly may be a cemented lens.

The camera lens LA of the catadioptric optical system satisfies the following conditions (1) to (2):

$$0.035 \leq (nd1/v1)+(nd2/v2) \leq 0.085 \tag{1};$$

$$-0.40 \leq (nd1+nd2)/f3g \leq -0.10 \tag{2},$$

where nd1 denotes a refractive index of d line of the first lens assembly;

nd2 denotes a refractive index of d line of the second lens assembly;

v1 denotes an abbe number of the first lens assembly;

v2 denotes an abbe number of the second lens assembly; and f3g denotes a combined focal length of the third lens group.

The condition (1) specifies a ratio of the refractive index of the first lens assembly to the abbe number of the first lens assembly and a ratio of the refractive index of the second lens assembly to the abbe number of the second lens assembly. If it is outside the range of condition (1), it is difficult to achieve a narrow angle and a small height with good optical characteristics, which is not preferable.

The condition (2) specifies a ratio of the refractive index of the first lens assembly to the combined focal length of the third lens group and a ratio of the refractive index of the second lens assembly to the combined focal length of the third lens group. If it is outside the range of condition (2), correction of aberrations becomes more difficult, which is not preferable.

The camera lens LA of the catadioptric optical system satisfies the following condition (3):

$$-0.20 \leq d9/f3g \leq 0.00 \tag{3},$$

where d9 denotes an on-axis distance from the sixth refractive surface S8 to the seventh refractive surface S9; and f3g denotes the combined focal length of the third lens group.

The condition (3) specifies a ratio of an on-axis air gap between the first lens assembly L1 and the third lens group Gr3 to the combined focal length of the third lens group. If it is within the range of condition (3), a camera lens having a narrow angle and a small height with good optical characteristics can be easily achieved, which is preferable.

The first lens assembly L1 satisfies the following condition (4):

$$0.25 \leq TTL/f \leq 0.35 \quad (4),$$

where TTL denotes an optical length indicating an on-axis distance from the second reflective surface to an image plane; and f denotes a focal length of the camera lens of the catadioptric optical system.

The condition (4) specifies a ratio of the optical length to the focal length. If it is below an upper limit of the condition (4), a narrow angle can be easily achieved. If it is above a lower limit of the condition (4), correction of a spherical aberration and a coma can be easily achieved. Thus, the condition (4) is preferable.

The camera lens LA of the catadioptric optical system satisfies the following condition (5):

$$-0.85 \leq TTL/f3g \leq -0.20 \quad (5),$$

where TTL denotes the optical length indicating an on-axis distance from the second reflective surface to an image plane; and f3g denotes the combined focal length of the third lens group.

The condition (5) specifies a ratio of the optical length to the combined focal length of the third lens group Gr3. If it is below an upper limit of the condition (5), a narrow angle can be easily achieved. If it is above a lower limit of the condition (5), correction of a spherical aberration and a coma can be easily achieved. Thus, the condition (5) is preferable.

The camera lens LA of the catadioptric optical system satisfies the following condition (6):

$$3.05 \leq TTL/IH \leq 3.40 \quad (6),$$

where TTL denotes the optical length indicating an on-axis distance from the second reflective surface to an image plane; and IH denotes a maximum image height.

The condition (6) specifies a ratio of the optical length to the maximum image height. If it is below an upper limit of the condition (6), a small height can be achieved to a great extent for the optical length with respect to the image height. If it is above a lower limit of the condition (6), correction of a spherical aberration and a coma can be easily achieved. Thus, the condition (6) is preferable.

The two lens assemblies and one lens group of the camera lens LA satisfy the above construction and conditions, so as to obtain the camera lens of a catadioptric optical system consisting of two lens assemblies and one lens group and having a small height, a narrow angle, and good optical characteristics.

EMBODIMENTS

The camera lens LA of the catadioptric optical system according to the present invention will be described with reference to the embodiments below. The reference signs described in the embodiments are listed below. In addition, the distance, radius and center thickness are all in a unit of mm.

f: focal length of the camera lens LA of the catadioptric optical system;

f3g: combined focal length of the third lens group;

Fno: F number;

2ω: full field of view;

STOP: aperture;

R: curvature radius of an optical surface, a central curvature radius for a lens;

R1: curvature radius of the first refractive surface S1;
R2: curvature radius of the second refractive surface S2;
R3: curvature radius of the third refractive surface S3;
R4: curvature radius of the first reflective surface S4;
R5: curvature radius of the fourth refractive surface S5;
R6: curvature radius of the fifth refractive surface S6;
R7: curvature radius of the second reflective surface S7;
R8: curvature radius of the sixth refractive surface S8;
R9: curvature radius of the seventh refractive surface S9;
R10: curvature radius of the eighth refractive surface S10;
R11: curvature radius of the ninth refractive surface S11;
R12: curvature radius of the tenth refractive surface S12;
R13: curvature radius of an object side surface of the glass plate GF;
R14: curvature radius of an image side surface of the glass plate GF;

d: center thickness of a lens or distance between lenses;
d1: on-axis center thickness from the first refractive surface S1 to the second refractive surface S2;
d2: on-axis distance from the second refractive surface S2 to the aperture STOP;
d3: on-axis distance from the aperture STOP to the third refractive surface S3;
d4: on-axis center thickness from the third refractive surface S3 to the first reflective surface S4;
d5: on-axis center thickness from the first reflective surface S4 to the fourth refractive surface S5;
d6: on-axis distance from the fourth refractive surface S5 to the fifth refractive surface S6;
d7: on-axis center thickness from the fifth refractive surface S6 to the second reflective surface S7;
d8: on-axis center thickness from the second reflective surface S7 to the sixth refractive surface S8;
d9: on-axis distance from the sixth refractive surface S8 to the seventh refractive surface S9;
d10: on-axis center thickness from the seventh refractive surface S9 to the eighth refractive surface S10;
d11: on-axis distance from the eighth refractive surface S10 to the ninth refractive surface S11;
d12: on-axis center thickness from the ninth refractive surface S11 to the tenth refractive surface S12;
d13: on-axis distance from the tenth refractive surface S12 to an object side surface S13 of the glass plate GF;
d14: center thickness of the glass plate GF;
d15: on-axis distance from an image side surface S13 of the glass plate GF to the image plane;
TTL: total optical length (on-axis distance from the second reflective surface S7 to the image plane);
LB: on-axis distance from the image side surface of the third lens group Gr3 to the image plane (including a thickness of the glass plate GF); and
IH: maximum image height.

$$Y=(x^2/R)/[1+\{1-(k+1)(x^2/R2)\}^{1/2}]+A4x^4+A6x^6+A8x^8+A10x^{10}+A12x^{12}+A14x^{14}+A16x^{16}+A18x^{18}+A20x^{20} \quad (7)$$

For convenience, the aspheric surface of each lens surface uses the aspheric surface defined in Equation (7). However, the present invention is not limited to the aspherical polynomial defined in Equation (7).

First Embodiment

FIG. 1 is a schematic diagram of a camera lens LA of a catadioptric optical system according to a first embodiment of the present invention. The curvature radiuses R of the reflective surfaces and refractive surfaces of the first lens assembly L1 to the glass plate GF of the camera lens LA of the catadioptric optical system according to the first embodiment, the center thicknesses of the lenses, or distances d between the lenses, refractive indexes nd, Abbe numbers ν are shown in Table 1; conic coefficients k and aspheric coefficients are shown in Table 2; and 2ω, Fno, f, f3g, TTL, LB, and IH are shown in Table 3.

TABLE 1

|  | R | d |  | nd |  | vd | Effective Radius(mm) |
|---|---|---|---|---|---|---|---|
| S1 | R1 | 15.23826 | d1 | 3.560 | nd1 | 1.4959 v1 | 81.65 | 7.113 |
| S2 | R2 | −135.80741 | d2 | −0.466 |  |  |  | 6.904 |
| STOP |  | ∞ |  | 2.099 |  |  |  | 6.696 |
| S3 | R3 | −10.71940 | d4 | 0.639 | nd2 | 1.4959 v2 | 81.65 | 6.684 |
| S4 | R4 | 13.08165 | d5 | −0.639 |  |  |  | 6.703 |
| S5 | R5 | −10.71940 | d6 | −1.633 |  |  |  | 5.941 |
| S6 | R6 | −135.80741 | d7 | −2.954 | nd1 | 1.4959 v1 | 81.65 | 4.990 |
| S7 | R7 | −5.22435 | d8 | 2.954 |  |  |  | 2.200 |
| S8 | R8 | −135.80741 | d9 | 0.400 |  |  |  | 1.875 |
| S9 | R9 | 5.16188 | d10 | 0.819 | nd3 | 1.5346 v3 | 55.69 | 1.830 |
| S10 | R10 | −14.42188 | d11 | 0.542 |  |  |  | 1.829 |
| S11 | R11 | −7.59467 | d12 | 0.538 | nd4 | 1.5346 v4 | 55.69 | 1.808 |
| S12 | R12 | 2.15010 | d13 | 0.600 |  |  |  | 2.070 |
| S13 | R13 | ∞ | d14 | 0.210 | ndg | 1.5168 vg | 64.17 | 2.140 |
| S14 | R14 | ∞ | d15 | 0.267 |  |  |  | 2.162 |

Reference Wavelength = 588 nm

TABLE 2

| | Conic coefficient | Aspherical coefficient | | | |
|---|---|---|---|---|---|
| | k | A4 | A6 | A8 | A10 |
| S1 | 0.0000E+00 | −2.9882E−04 | 9.6686E−06 | −1.1090E−06 | 8.9690E−08 |
| S2 | 0.0000E+00 | −8.2200E−04 | −7.6322E−08 | 1.3138E−06 | −8.2141E−08 |
| S3 | 6.3355E−01 | −5.6827E−04 | 1.5955E−04 | −1.8191E−05 | 1.1276E−06 |
| S4 | −1.9425E−01 | −1.0691E−04 | 4.2839E−05 | −4.7389E−06 | 2.7817E−07 |
| S5 | 6.3355E−01 | −5.6827E−04 | 1.5955E−04 | −1.8191E−05 | 1.1276E−06 |
| S6 | 0.0000E+00 | −8.2200E−04 | −7.6322E−08 | 1.3138E−06 | −8.2141E−08 |
| S7 | −1.5551E+00 | 4.0822E−04 | −4.2586E−03 | 5.5346E−03 | −4.4716E−03 |
| S8 | 0.0000E+00 | −8.2200E−04 | −7.6322E−08 | 1.3138E−06 | −8.2141E−08 |
| S9 | 0.0000E+00 | −2.7155E−02 | 3.7329E−02 | −4.9331E−02 | 3.6312E−02 |
| S10 | 0.0000E+00 | −6.1470E−02 | 5.5202E−02 | −6.3484E−02 | 6.1757E−02 |
| S11 | 0.0000E+00 | −2.8363E−01 | 2.6927E−01 | −2.1879E−01 | 1.7026E−01 |
| S12 | 0.0000E+00 | −2.6983E−01 | 2.4864E−01 | −2.0038E−01 | 1.2624E−01 |

| | Aspherical coefficient | | | | |
|---|---|---|---|---|---|
| | A12 | A14 | A16 | A18 | A20 |
| S1 | −4.3020E−09 | 1.2505E−10 | −2.1479E−12 | 2.0158E−14 | −8.0755E−17 |
| S2 | 2.9243E−09 | −5.6780E−11 | 5.4307E−13 | −1.9608E−15 | 0.0000E+00 |
| S3 | −4.0156E−08 | 8.6093E−10 | −1.1123E−11 | 8.0872E−14 | −2.5602E−16 |
| S4 | −9.5363E−09 | 1.9331E−10 | −2.4734E−12 | 1.7045E−14 | −4.9621E−17 |
| S5 | −4.0156E−08 | 8.6093E−10 | −1.1123E−11 | 8.0872E−14 | −2.5602E−16 |
| S6 | 2.9243E−09 | −5.6780E−11 | 5.4307E−13 | −1.9608E−15 | 0.0000E+00 |
| S7 | 2.2137E−03 | −6.7402E−04 | 1.2367E−04 | −1.2562E−05 | 5.4315E−07 |
| S8 | 2.9243E−09 | −5.6780E−11 | 5.4307E−13 | −1.9608E−15 | 0.0000E+00 |
| S9 | −1.2371E−02 | 1.6615E−04 | 1.2160E−03 | −3.5054E−04 | 3.2072E−05 |
| S10 | −3.7418E−02 | 1.3538E−02 | −2.7960E−03 | 2.8515E−04 | −9.2005E−06 |
| S11 | −1.0447E−01 | 4.3280E−02 | −1.1156E−02 | 1.6124E−03 | −9.9629E−05 |
| S12 | −5.8050E−02 | 1.8177E−02 | −3.6366E−03 | 4.1781E−04 | −2.0987E−05 |

TABLE 3

| | |
|---|---|
| 2ω (°) | 9.52 |
| Fno | 1.75 |
| f (mm) | 24.500 |
| f3g (mm) | −7.570 |
| TTL (mm) | 6.330 |
| LB (mm) | 1.077 |
| IH (mm) | 2.040 |

The following Table 13 shows the corresponding values of the parameters defined in the conditions (1) to (6) of the first to fourth embodiments.

The first embodiment satisfies the conditions (1) to (6), as shown in Table 13.

Figure 2:
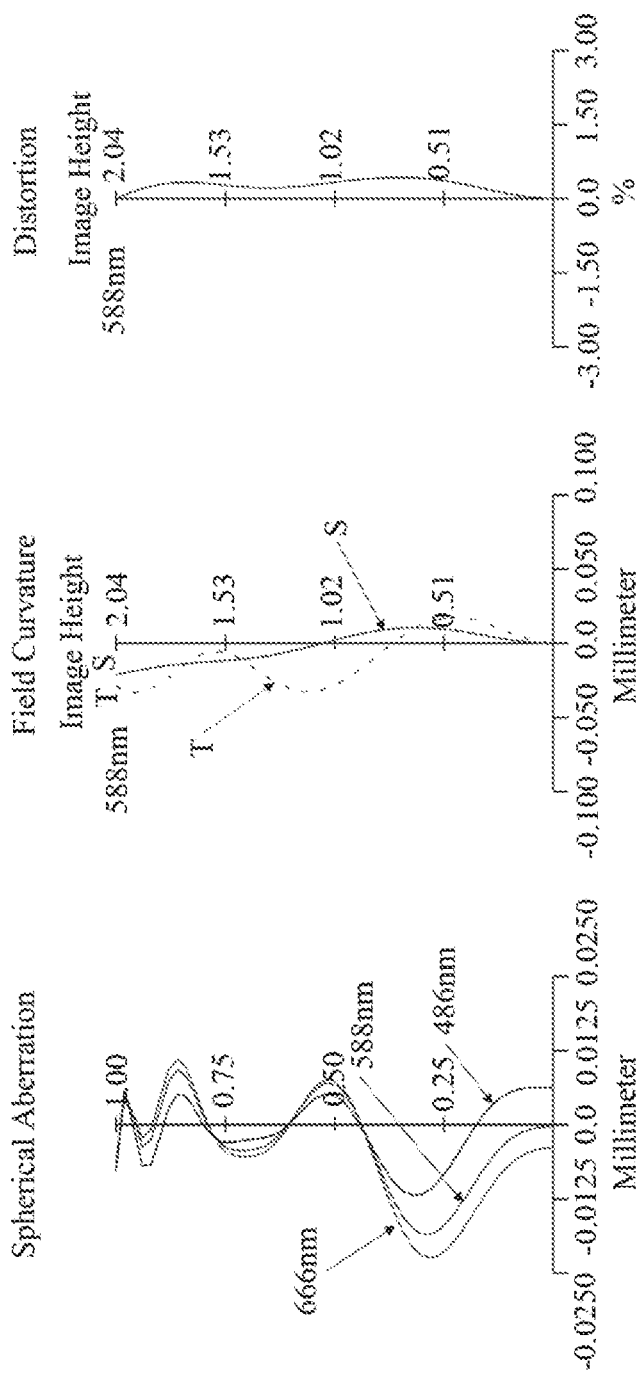
FIG. 2 is diagrams of a spherical aberration, a field curvature, a distortion of the camera lens LA according to the first embodiment of the present invention.

FIG. 2 illustrates a spherical aberration, a field curvature, and a distortion of the camera lens LA of the catadioptric optical system according to the first embodiment. In addition, in FIG. 2, S is a field curvature for a sagittal image plane, and T is a field curvature for a meridional image plane, which are the same for the second to fourth embodiments. As shown in FIG. 2, the camera lens LA of the catadioptric optical system according to the first embodiment has a narrow angle, 2ω=9.52°, and a small height, i.e., TTL/f=0.258, and good optical characteristics.

Second Embodiment

Figure 3:
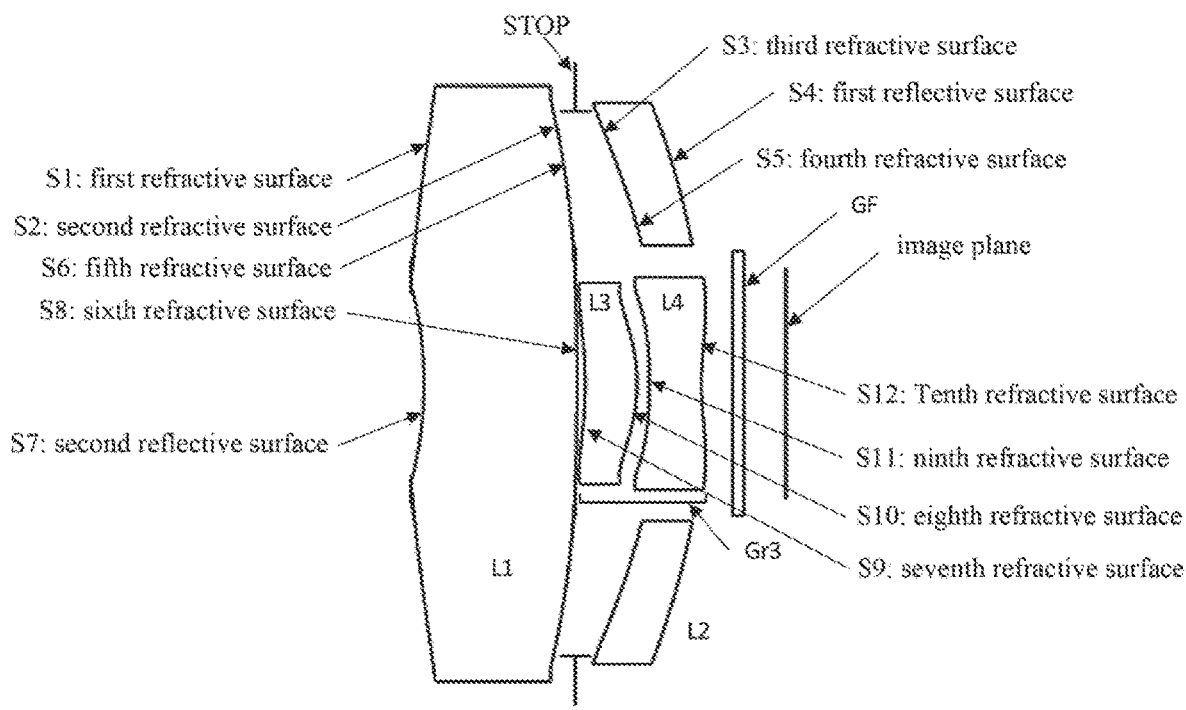
FIG. 3 is a schematic diagram showing an overview of a structure of a camera lens LA according to a second embodiment of the present invention.

FIG. 3 is a schematic diagram of a camera lens LA of a catadioptric optical system according to a second embodiment of the present invention. The curvature radiuses R of the reflective surfaces and refractive surfaces of the first lens assembly L1 to the glass plate GF of the camera lens LA of the catadioptric optical system according to the second embodiment, the center thicknesses of the lenses, or distances d between the lenses, refractive indexes nd, Abbe numbers ν are shown in Table 4; conic coefficients k and aspheric coefficients are shown in Table 5; and 2ω, Fno, f, f3g, TTL, LB, and IH are shown in Table 6.

TABLE 4

|  |  | R | d |  | nd |  | νd | Effective Radius(mm) |
|---|---|---|---|---|---|---|---|---|
| S1 | R1 | 22.06493 | d1 | 3.241 | nd1 | 1.8052 | ν1 40.89 | 5.619 |
| S2 | R2 | −71.82522 | d2 | −0.030 |  |  |  | 5.368 |
| STOP |  | ∞ |  | 1.595 |  |  |  | 5.147 |
| S3 | R3 | −11.16480 | d4 | 0.900 | nd2 | 1.7503 | ν2 44.94 | 5.060 |
| S4 | R4 | −13.71946 | d5 | −0.900 |  |  |  | 5.123 |
| S5 | R5 | −11.16480 | d6 | −1.565 |  |  |  | 4.469 |
| S6 | R6 | −71.82522 | d7 | −2.925 | nd1 | 1.8052 | ν1 40.89 | 3.511 |
| S7 | R7 | −7.52371 | d8 | 2.925 |  |  |  | 2.200 |
| S8 | R8 | −71.82522 | d9 | 0.169 |  |  |  | 1.903 |
| S9 | R9 | −7.84643 | d10 | 0.990 | nd3 | 1.5346 | ν3 55.69 | 1.904 |
| S10 | R10 | −3.82643 | d11 | 0.231 |  |  |  | 1.824 |
| S11 | R11 | 92.02379 | d12 | 1.000 | nd4 | 1.5346 | ν4 55.69 | 1.805 |
| S12 | R12 | 4.58532 | d13 | 0.600 |  |  |  | 2.009 |
| S13 | R13 | ∞ | d14 | 0.210 | ndg | 1.5168 | νg 64.17 | 2.061 |
| S14 | R14 | ∞ | d15 | 0.800 |  |  |  | 2.074 |

Reference Wavelength = 588 nm

TABLE 5

|  | Conic coefficient | Aspherical coefficient | | | |
|---|---|---|---|---|---|
|  | k | A4 | A6 | A8 | A10 |
| S1 | 0.0000E+00 | −2.9673E−04 | 1.0800E−05 | −1.2154E−06 | 1.3680E−07 |
| S2 | 0.0000E+00 | −7.4311E−04 | 2.0448E−05 | 2.4449E−07 | −6.8341E−08 |
| S3 | 4.3150E−01 | −6.2381E−04 | 1.6211E−04 | −1.8133E−05 | 1.1252E−06 |
| S4 | 9.8095E−02 | −1.2121E−04 | 4.2336E−05 | −4.7297E−06 | 2.7910E−07 |
| S5 | 4.3150E−01 | −6.2381E−04 | 1.6211E−04 | −1.8133E−05 | 1.1252E−06 |
| S6 | 0.0000E+00 | −7.4311E−04 | 2.0448E−05 | 2.4449E−07 | −6.8341E−08 |
| S7 | −5.6500E−01 | 7.0435E−04 | −4.4232E−03 | 5.6931E−03 | −4.5018E−03 |
| S8 | 0.0000E+00 | −7.4311E−04 | 2.0448E−05 | 2.4449E−07 | −6.8341E−08 |
| S9 | 0.0000E+00 | −1.7940E−03 | 7.4713E−04 | 9.4977E−03 | −1.0907E−02 |
| S10 | 0.0000E+00 | −7.2542E−02 | 1.1405E−01 | −1.1683E−01 | 1.0022E−01 |
| S11 | 0.0000E+00 | −1.3174E−01 | 1.2915E−01 | −1.1688E−01 | 9.8577E−02 |
| S12 | 0.0000E+00 | −7.1386E−02 | 4.1586E−02 | −3.0070E−02 | 2.1124E−02 |

|  | Aspherical coefficient | | | | |
|---|---|---|---|---|---|
|  | A12 | A14 | A16 | A18 | A20 |
| S1 | −9.6539E−09 | 4.0759E−10 | −1.0179E−11 | 1.3878E−13 | −7.9553E−16 |
| S2 | 3.4981E−09 | −8.3229E−11 | 8.5525E−13 | −1.7604E−15 | 0.0000E+00 |
| S3 | −4.0281E−08 | 8.6278E−10 | −1.1010E−11 | 7.9096E−14 | −2.2534E−16 |
| S4 | −9.5413E−09 | 1.9757E−10 | −2.5104E−12 | 2.0368E−14 | −1.0031E−16 |
| S5 | −4.0281E−08 | 8.6278E−10 | −1.1010E−11 | 7.9036E−14 | −2.2534E−16 |
| S6 | 3.4981E−09 | −8.3229E−11 | 8.5525E−13 | −1.7604E−15 | 0.0000E+00 |
| S7 | 2.2137E−03 | −6.7402E−04 | 1.2367E−04 | −1.2562E−05 | 5.4315E−07 |
| S8 | 3.4981E−09 | −8.3229E−11 | 8.5525E−13 | −1.7604E−15 | 0.0000E+00 |
| S9 | 7.1291E−03 | −3.0380E−03 | 7.9411E−04 | −1.1239E−04 | 6.5918E−06 |
| S10 | −6.2190E−02 | 2.5655E−02 | −6.6246E−03 | 9.6232E−04 | −5.9223E−05 |
| S11 | −6.5194E−02 | 2.9471E−02 | −8.3830E−03 | 1.3435E−03 | −9.1877E−05 |
| S12 | −1.1572E−02 | 4.3100E−03 | −1.0062E−03 | 1.3206E−04 | −7.4075E−06 |

TABLE 6

| 2ω (°) | 11.27 |
|---|---|
| Fno | 1.85 |
| f (mm) | 20.075 |
| f3g (mm) | −33.801 |
| TTL (mm) | 6.924 |
| LB (mm) | 1.610 |
| IH (mm) | 2.040 |

As shown in Table 13, the second embodiment satisfies the conditions (1) to (6).

Figure 4:
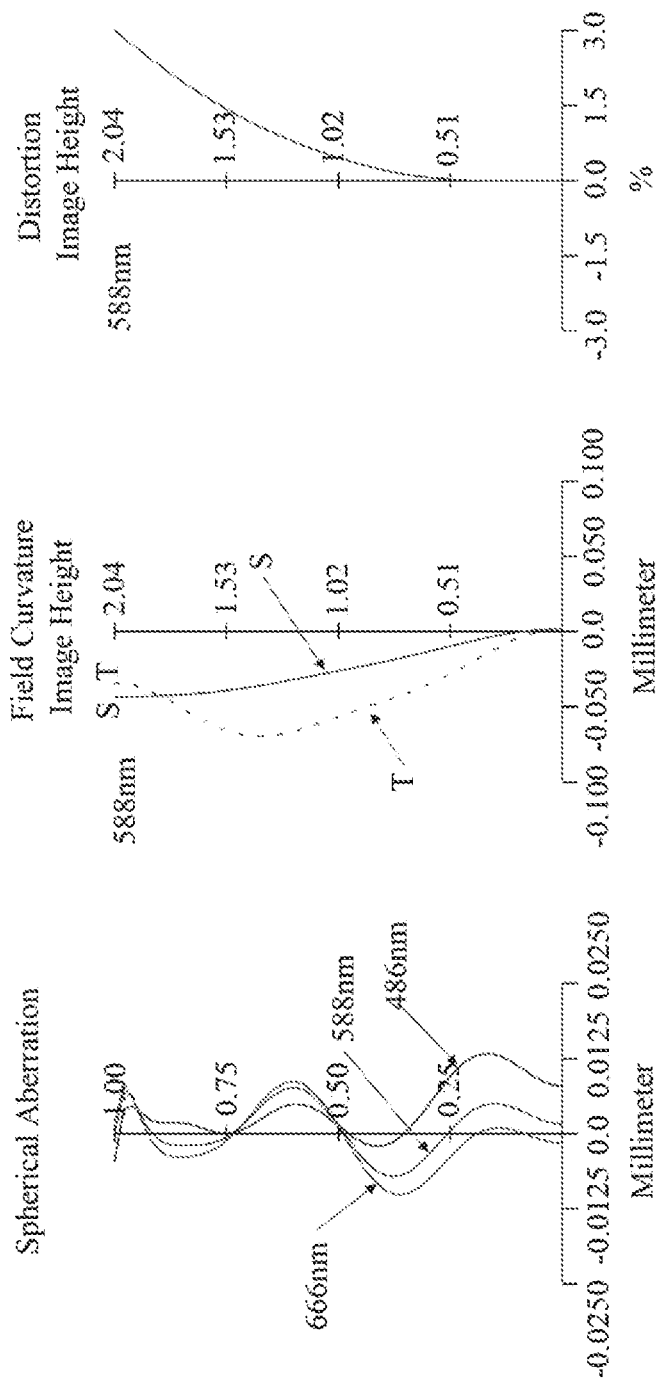
FIG. 4 is diagrams of a spherical aberration, a field curvature, a distortion of the camera lens LA according to the second embodiment of the present invention.

FIG. 4 illustrates a spherical aberration, a field curvature, and a distortion of the camera lens LA of the catadioptric optical system according to the second embodiment. As shown in FIG. 4, the camera lens LA of the catadioptric optical system according to the second embodiment has a narrow angle, 2ω=11.27°, and a small height, i.e., TTL/f=0.345, and good optical characteristics.

Third Embodiment

Figure 5:
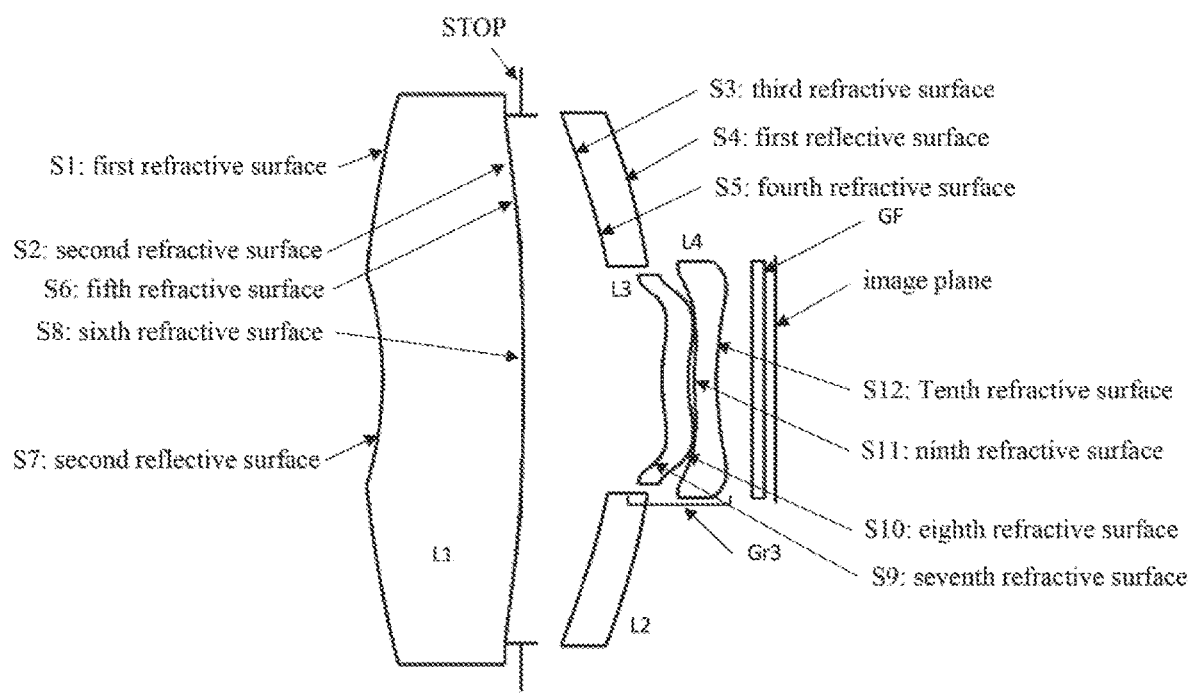
FIG. 5 is a schematic diagram showing an overview of a structure of a camera lens LA according to a third embodiment of the present invention.

FIG. 5 is a schematic diagram of a camera lens LA of a catadioptric optical system according to a third embodiment of the present invention. The curvature radiuses R of the reflective surfaces and refractive surfaces of the first lens assembly L1 to the glass plate GF of the camera lens LA of the catadioptric optical system according to the third embodiment, the center thicknesses of the lenses, or distances d between the lenses, refractive indexes nd, Abbe numbers v are shown in Table 7; conic coefficients k and aspheric coefficients are shown in Table 8; and 2ω, Fno, f, f3g, TTL, LB, and IH are shown in Table 9.

TABLE 7

| | | R | d | | nd | | vd | Effective Radius(mm) |
|---|---|---|---|---|---|---|---|---|
| S1 | R1 | 17.22592 | d1 | 2.729 | nd1 | 1.5444 | v1 | 55.82 | 5.022 |
| S2 | R2 | −65.36814 | d2 | −0.038 | | | | 4.732 |
| STOP | | ∞ | | 1.663 | | | | 4.649 |
| S3 | R3 | −10.54716 | d4 | 0.637 | nd2 | 1.5444 | v2 | 55.82 | 4.597 |
| S4 | R4 | −12.74110 | d5 | −0.637 | | | | 4.647 |
| S5 | R5 | −10.54716 | d6 | −1.625 | | | | 4.206 |
| S6 | R6 | −65.36814 | d7 | −2.366 | nd1 | 1.5444 | v1 | 55.82 | 3.239 |
| S7 | R7 | −6.52935 | d8 | 2.366 | | | | 2.200 |
| S8 | R8 | −65.36814 | d9 | 2.347 | | | | 1.830 |
| S9 | R9 | 3.60256 | d10 | 0.437 | nd3 | 1.5346 | v3 | 55.69 | 1.841 |
| S10 | R10 | 2.47703 | d11 | 0.111 | | | | 1.797 |
| S11 | R11 | 6.46578 | d12 | 0.371 | nd4 | 1.5346 | v4 | 55.89 | 1.900 |
| S12 | R12 | 5.00895 | d13 | 0.600 | | | | 2.086 |
| S13 | R13 | ∞ | d14 | 0.210 | ndg | 1.5168 | vg | 64.17 | 2.056 |
| S14 | R14 | ∞ | d15 | 0.188 | | | | 2.098 |

Reference Wavelength = 588 nm

TABLE 8

| | Conic coefficient | Aspherical coefficient | | | |
|---|---|---|---|---|---|
| | k | A4 | A6 | A8 | A10 |
| S1 | 0.0000E+00 | −5.8079E−04 | 9.0322E−05 | −1.4149E−05 | 1.4255E−06 |
| S2 | 0.0000E+00 | −9.0589E−04 | 8.2078E−05 | −1.0066E−05 | 9.0987E−07 |
| S3 | −1.0961E−01 | −5.5024E−04 | 1.6376E−04 | −1.8114E−05 | 1.1253E−06 |
| S4 | −9.5538E−02 | −1.1009E−04 | 4.2789E−05 | −4.7317E−06 | 2.7834E−07 |
| S5 | −1.0961E−01 | −5.5024E−04 | 1.6376E−04 | −1.8114E−05 | 1.1253E−06 |
| S6 | 0.0000E+00 | −9.0589E−04 | 8.2078E−05 | −1.0066E−05 | 9.0967E−07 |
| S7 | −1.5064E+00 | 8.6533E−04 | −4.1759E−03 | 5.5843E−03 | −4.4789E−03 |
| S8 | 0.0000E+00 | −9.0589E−04 | 8.2078E−05 | −1.0066E−05 | 9.0967E−07 |
| S9 | 0.0000E+00 | −3.5216E−02 | −1.5217E−01 | 4.5657E−01 | −7.7265E−01 |
| S10 | 0.0000E+00 | −1.1553E−01 | −3.1943E−02 | 9.4861E−02 | −1.2803E−01 |
| S11 | 0.0000E+00 | −7.4161E−04 | −3.7707E−01 | 6.8505E−01 | −5.8939E−01 |
| S12 | 0.0000E+00 | 5.5303E−02 | −3.5384E−01 | 5.8312E−01 | −4.8864E−01 |

| | Aspherical coefficient | | | | |
|---|---|---|---|---|---|
| | A12 | A14 | A16 | A18 | A20 |
| S1 | −9.3374E−08 | 4.0455E−09 | −1.1199E−10 | 1.7917E−12 | −1.2534E−14 |
| S2 | −4.9543E−08 | 1.6281E−09 | −2.9940E−11 | 2.4697E−13 | 0.0000E+00 |
| S3 | −4.0355E−08 | 8.6027E−10 | −1.0734E−11 | 9.3909E−14 | −6.9475E−16 |
| S4 | −9.5512E−09 | 1.9827E−10 | −2.4533E−12 | 1.9526E−14 | −1.2049E−16 |
| S5 | −4.0355E−08 | 8.6027E−10 | −1.0734E−11 | 9.3909E−14 | −6.9475E−16 |
| S6 | −4.9543E−08 | 1.6261E−09 | −2.9940E−11 | 2.4697E−13 | 0.0000E+00 |
| S7 | 2.2182E−03 | −6.7735E−04 | 1.2366E−04 | −1.2432E−05 | 5.4315E−07 |
| S8 | −4.9543E−08 | 1.6261E−09 | −2.9940E−11 | 2.4697E−13 | 0.0000E+00 |
| S9 | 7.3377E−01 | −4.0625E−01 | 1.2903E−01 | −2.1670E−02 | 1.4890E−03 |
| S10 | 9.1270E−02 | −3.8888E−02 | 1.0021E−02 | −1.4514E−03 | 9.3397E−05 |

TABLE 8-continued

| | | | | | |
|---|---|---|---|---|---|
| S11 | 2.7766E−01 | −7.3236E−02 | 1.0088E−02 | −5.4614E−04 | −3.5235E−06 |
| S12 | 2.4124E−01 | −7.3488E−02 | 1.3603E−02 | −1.4047E−03 | 6.2140E−05 |

TABLE 9

| | |
|---|---|
| 2ω (°) | 10.79 |
| Fno | 2.20 |
| f (mm) | 21.384 |
| f3g (mm) | −12.354 |
| TTL (mm) | 6.630 |
| LB (mm) | 0.998 |
| IH (mm) | 2.040 |

As shown in Table 13, the third embodiment satisfies the conditions (1) to (6).

Figure 6:
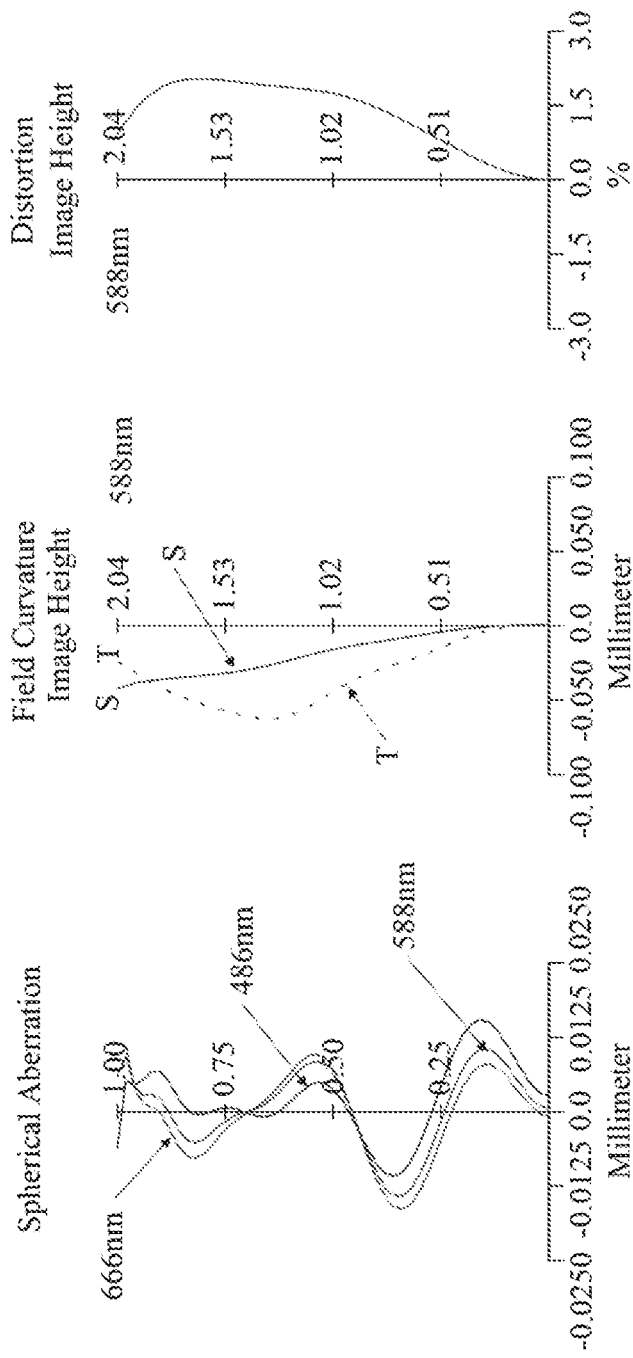
FIG. 6 is diagrams of a spherical aberration, a field curvature, a distortion of the camera lens LA according to the third embodiment of the present invention.

FIG. 6 illustrates a spherical aberration, a field curvature, and a distortion of the camera lens LA of the catadioptric optical system according to the third embodiment. As shown in FIG. 6, the camera lens LA of the catadioptric optical system according to the third embodiment has a narrow angle, $2\omega=10.79°$, and a small height, i.e., $TTL/f=0.31$, and good optical characteristics.

Fourth Embodiment

Figure 7:
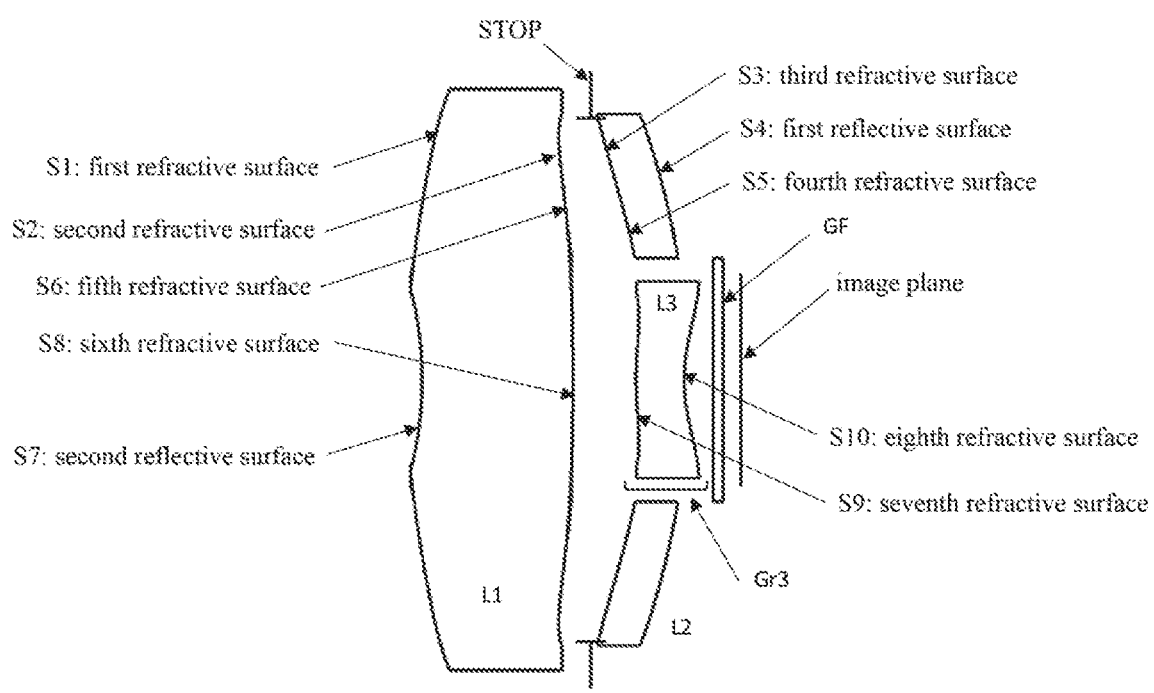
FIG. 7 is a schematic diagram showing an overview of a structure of a camera lens LA according to a fourth embodiment of the present invention.

FIG. 7 is a schematic diagram of a camera lens LA of a catadioptric optical system according to a fourth embodiment of the present invention. The curvature radiuses R of the reflective surfaces and refractive surfaces of the first lens assembly L1 to the glass plate GF of the camera lens LA of the catadioptric optical system according to the fourth embodiment, the center thicknesses of the lenses, or distances d between the lenses, refractive indexes nd, Abbe numbers ν are shown in Table 10; conic coefficients k and aspheric coefficients are shown in Table 11; and 2ω, Fno, f, f3g, TTL, LB, and IH are shown in Table 12.

TABLE 10

| | | R | d | | nd | | vd | Effective Radius(mm) |
|---|---|---|---|---|---|---|---|---|
| S1 | R1 | 17.17695 | 3.478 | d1 | 1.5444 | nd1 | 55.82 v1 | 5.957 |
| S2 | R2 | −71.08517 | 0.375 | d2 | | | | 5.454 |
| STOP | | ∞ | 1.191 | | | | | 5.362 |
| S3 | R3 | −11.37815 | 0.831 | d4 | 1.5444 | nd2 | 55.82 v2 | 5.369 |
| S4 | R4 | −14.67556 | −0.831 | d5 | | | | 5.473 |
| S5 | R5 | −11.37815 | −1.566 | d6 | | | | 4.923 |
| S6 | R6 | −71.08517 | −3.138 | d7 | 1.5444 | nd1 | 55.82 v1 | 3.943 |
| S7 | R7 | −7.66770 | 3.138 | d8 | | | | 2.200 |
| S8 | R8 | −71.08517 | 1.313 | d9 | | | | 1.936 |
| S9 | R9 | 7.16843 | 1.000 | d10 | 1.5346 | nd3 | 55.69 v3 | 1.805 |
| S10 | R10 | 3.27047 | 0.600 | d11 | | | | 2.023 |
| S11 | R11 | ∞ | 0.210 | d12 | 1.5168 | ndg | 84.17 vg | 2.053 |
| S12 | R12 | ∞ | 0.360 | d13 | | | | 2.067 |

Reference Wavelength = 588 nm

TABLE 11

| | Conic coefficient | Aspherical coefficient | | | |
|---|---|---|---|---|---|
| | k | A4 | A6 | A8 | A10 |
| S1 | 0.0000E+00 | −6.3617E−04 | 1.1804E−04 | −1.6882E−05 | 1.3958E−06 |
| S2 | 0.0000E+00 | −9.2119E−04 | 1.3671E−04 | −2.0129E−05 | 1.7913E−06 |
| S3 | −6.9359E−01 | −4.8424E−04 | 1.6302E−04 | −1.8095E−05 | 1.1263E−06 |
| S4 | −1.8369E−01 | −1.0583E−04 | 4.3606E−05 | −4.7314E−06 | 2.7780E−07 |
| S5 | −6.9352E−01 | −4.8424E−04 | 1.6302E−04 | −1.8095E−05 | 1.1263E−06 |
| S6 | 0.0000E+00 | −9.2119E−04 | 1.3671E−04 | −2.0129E−05 | 1.7913E−06 |
| S7 | 6.7416E−01 | 4.3696E−04 | −3.8076E−03 | 5.4419E−03 | −4.4781E−03 |
| S8 | 0.0000E+00 | −9.2119E−04 | 1.3671E−04 | −2.0129E−05 | 1.7913E−06 |
| S9 | 0.0000E+00 | −1.0628E−02 | −3.9146E−02 | 6.3655E−02 | −6.1650E−02 |
| S10 | 0.0000E+00 | −2.1578E−02 | −9.4905E−03 | 1.1019E−02 | −6.5575E−03 |

| | Aspherical coefficient | | | | |
|---|---|---|---|---|---|
| | A12 | A14 | A16 | A18 | A20 |
| S1 | −7.0618E−08 | 2.2221E−09 | −4.2126E−11 | 4.3928E−13 | −1.9302E−15 |
| S2 | −9.3890E−08 | 2.9184E−09 | −4.9705E−11 | 3.6214E−13 | 0.0000E+00 |
| S3 | −4.0384E−08 | 8.5572E−10 | −1.0920E−11 | 9.0680E−14 | −5.0725E−16 |
| S4 | −9.5805E−09 | 1.9744E−10 | −2.4829E−12 | 2.0019E−14 | −1.0246E−16 |
| S5 | −4.0384E−08 | 8.5572E−10 | −1.0920E−11 | 9.0680E−14 | −5.0725E−16 |
| S6 | −9.3890E−08 | 2.9184E−09 | −4.9705E−11 | 3.6214E−13 | 0.0000E+00 |
| S7 | 2.2144E−03 | −6.7402E−04 | 1.2367E−04 | −1.2562E−05 | 5.4315E−07 |

TABLE 11-continued

| | | | | | |
|---|---|---|---|---|---|
| S8 | −9.3890E−08 | 2.9184E−09 | −4.9705E−11 | 3.6214E−13 | 0.0000E+00 |
| S9 | 3.7779E−02 | −1.4695E−02 | 3.5115E−03 | −4.6949E−04 | 2.6866E−05 |
| S10 | 2.2129E−03 | −3.6373E−04 | 5.1476E−07 | 8.5376E−06 | −8.6063E−07 |

TABLE 12

| | |
|---|---|
| 2ω (°) | 10.58 |
| Fno | 1.88 |
| f (mm) | 21.387 |
| f3g (mm) | −12.355 |
| TTL (mm) | 6.630 |
| LB (mm) | 1.179 |
| IH (mm) | 2.040 |

As shown in Table 13, the fourth embodiment satisfies the conditions (1) to (6).

Figure 8:
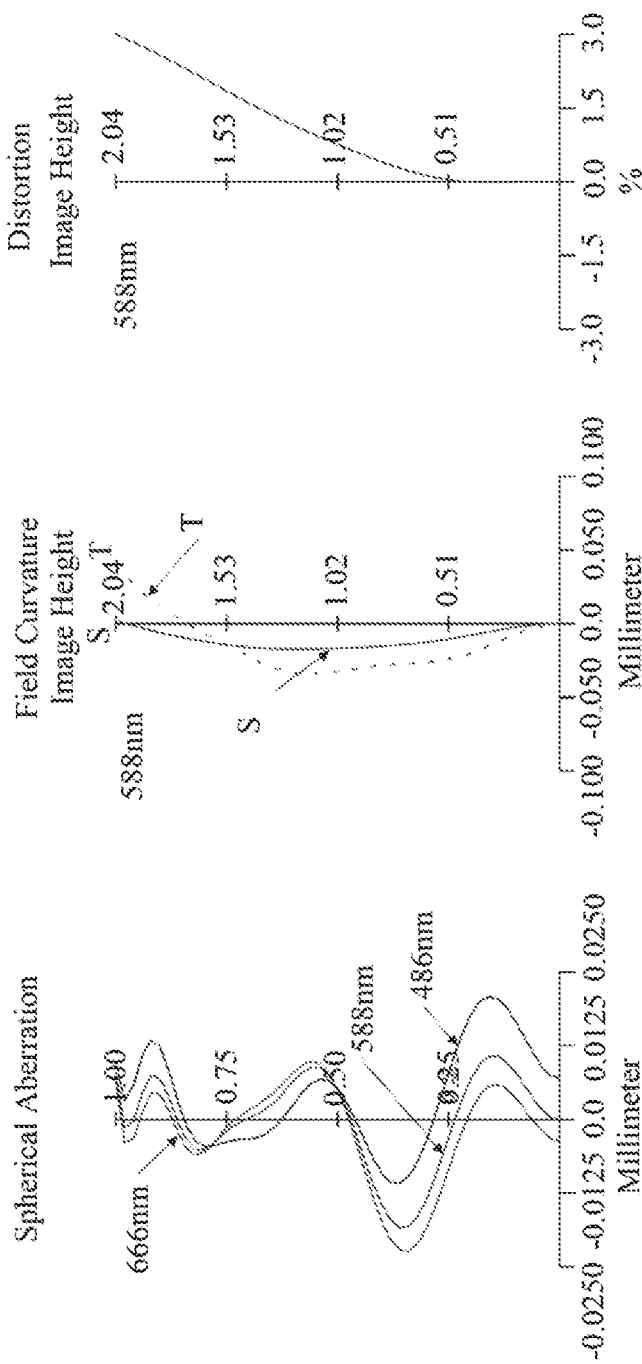
FIG. 8 is diagrams of a spherical aberration, a field curvature, a distortion of the camera lens LA according to the fourth embodiment of the present invention.

FIG. 8 illustrates a spherical aberration, a field curvature, and a distortion of the camera lens LA of the catadioptric optical system according to the fourth embodiment. As shown in FIG. 8, the camera lens LA of the catadioptric optical system according to the fourth embodiment has a narrow angle, $2\omega=10.58°$, and a small height, i.e., TTL/f=0.31, and good optical characteristics.

Table 13 shows the values of the parameter defined in the conditions (1) to (6) of the first to fourth embodiments.

TABLE 13

| | Embodiment 1 | Embodiment 2 | Embodiment 3 | Embodiment 4 | Notes |
|---|---|---|---|---|---|
| (nd1/v1) + (nd2/v2) | 0.037 | 0.083 | 0.055 | 0.055 | condition (1) |
| (nd1 + nd2)/f3g | −0.395 | −0.105 | −0.250 | −0.250 | condition (2) |
| d9/f3g | −0.053 | −0.005 | −0.190 | −0.106 | condition (3) |
| TTL/f | 0.258 | 0.345 | 0.310 | 0.310 | condition (4) |
| TTL/f3g | −0.836 | −0.205 | −0.537 | −0.537 | condition (5) |
| TTL/IH | 3.103 | 3.394 | 3.250 | 3.250 | condition (6) |

What is claimed is:

1. A camera lens of a catadioptric optical system, comprising, sequentially from an object side:
a first lens assembly having a reflective power and a refractive power, wherein an object side surface of the first lens assembly comprises a first refractive surface in a peripheral region thereof and a second reflective surface in a central region thereof, and an image side surface of the first lens assembly comprises, sequentially from a peripheral region to a central region thereof, a second refractive surface, a fifth refractive surface and a sixth refractive surface, wherein the second refractive surface and the sixth refractive surface are connected through the fifth refractive surface;
a second lens assembly having a reflective power and a refractive power, wherein an object side surface of the second lens assembly comprises, sequentially from a peripheral region to a central region thereof, a third refractive surface and a fourth refractive surface, and an image side surface of the second lens assembly comprises a first reflective surface; and
a third lens group having a refractive power,
wherein the camera lens satisfies following conditions:

$0.035 \leq (nd1/v1)+(nd2/v2) \leq 0.085;$ $-0.85 \leq TTL/f3g \leq -0.20;$ and $-0.40 \leq (nd1+nd2)/f3g \leq -0.10,$ where
nd1 denotes a refractive index of d line of the first lens assembly;
nd2 denotes a refractive index of d line of the second lens assembly;
v1 denotes an abbe number of the first lens assembly;
v2 denotes an abbe number of the second lens assembly;
TTL denotes an optical length indicating an on-axis distance from the second reflective surface to an image plane; and
f3g denotes a combined focal length of the third lens group.

2. The camera lens as described in claim 1, wherein an object side surface of the third lens assembly comprises a seventh refractive surface; and
wherein the camera lens further satisfies a following condition:

$-0.20 \leq d9/f3g \leq 0.00,$ where
d9 denotes an on-axis distance from the sixth refractive surface to a seventh refractive surface.

3. The camera lens as described in claim 1, further satisfying a following condition:

$0.25 \leq TTL/f \leq 0.35,$ where
TTL denotes an optical length indicating an on-axis distance from the second reflective surface to an image plane; and f denotes a focal length of the whole optical system of camera lens.

4. The camera lens as described in claim 1, further satisfying a following condition:

$$3.05 \leq TTL/IH \leq 3.40,$$

where

TTL denotes an optical length indicating an on-axis distance from the second reflective surface to an image plane; and IH denotes a maximum image height.

* * * * *